(12) United States Patent
Ishida et al.

(10) Patent No.: US 11,021,387 B2
(45) Date of Patent: Jun. 1, 2021

(54) MANUFACTURING METHOD FOR LAMINATED GLASS

(71) Applicant: AGC INC., Tokyo (JP)

(72) Inventors: Takahiro Ishida, Tokyo (JP); Masashi Kasajima, Tokyo (JP); Tsuyoshi Otsuka, Tokyo (JP); Raita Sugisaki, Tokyo (JP); Yoshinobu Morita, Tokyo (JP)

(73) Assignee: AGC INC., Tokyo (JP)

( * ) Notice: Subject to any disclaimer, the term of this patent is extended or adjusted under 35 U.S.C. 154(b) by 60 days.

(21) Appl. No.: 15/616,709

(22) PCT Filed: Nov. 19, 2015

(86) PCT No.: PCT/JP2015/082529
§ 371 (c)(1),
(2) Date: Jun. 7, 2017

(87) PCT Pub. No.: WO2016/093031
PCT Pub. Date: Jun. 16, 2016

(65) Prior Publication Data
US 2017/0341970 A1    Nov. 30, 2017

(30) Foreign Application Priority Data
Dec. 10, 2014   (JP) .............................. JP2014-249700

(51) Int. Cl.
*C03B 23/03* (2006.01)
*C03B 23/025* (2006.01)
(Continued)

(52) U.S. Cl.
CPC .... *C03B 23/0302* (2013.01); *B32B 17/10036* (2013.01); *B32B 17/10761* (2013.01);
(Continued)

(58) Field of Classification Search
CPC ............................................. C03B 23/03–0307
See application file for complete search history.

(56) References Cited

U.S. PATENT DOCUMENTS 4,009,064 A * 2/1977 Andrews .................. B32B 17/10
                                                          156/102
4,043,782 A    8/1977 Bamford et al.
(Continued)

FOREIGN PATENT DOCUMENTS

EP    2 233 444 A1    9/2010
JP    H03-78027 U    8/1991
(Continued)

OTHER PUBLICATIONS

International Search Report issued in International Patent Application No. PCT/JP2015/082529 dated Jan. 19, 2016.

*Primary Examiner* — Erin Snelting
(74) *Attorney, Agent, or Firm* — Foley & Lardner LLP

(57) ABSTRACT

A manufacturing method for a laminated glass in which a plurality of glass plates are laminated, includes a first main forming step of heating a first glass plate to a first softening point or higher to perform a main forming; a second main forming step of heating a second glass plate to a second softening point or higher to perform the main forming; a first finish forming step of bending and forming the first glass plate into a desired shape; and a second finish forming step of bending and forming the second glass plate into a desired shape. The first and second main forming steps are performed by using a same forming die. A first condition for lowering a temperature of the first glass plate to below the first softening point and a second condition for the second glass plate are different from each other.

16 Claims, 5 Drawing Sheets

(51) Int. Cl.
  *C03B 25/02* (2006.01)
  *B32B 17/00* (2006.01)
  *C03C 17/00* (2006.01)
  *B32B 17/10* (2006.01)
  *C03C 27/10* (2006.01)
(52) U.S. Cl.
  CPC .. *B32B 17/10807* (2013.01); *B32B 17/10816* (2013.01); *B32B 17/10889* (2013.01); *C03B 23/025* (2013.01); *C03B 23/03* (2013.01); *C03B 25/025* (2013.01); *C03C 27/10* (2013.01); *B32B 2250/40* (2013.01); *B32B 2605/006* (2013.01)

(56) References Cited

U.S. PATENT DOCUMENTS

| | | | |
|---|---|---|---|
| 4,952,227 A | 8/1990 | Herrington et al. | |
| 6,582,799 B1 * | 6/2003 | Brown | B32B 17/10036 296/190.1 |
| 7,713,631 B2 * | 5/2010 | Yamada | B32B 17/10036 156/212 |
| 8,443,628 B2 * | 5/2013 | Fredholm | C03B 23/0252 65/64 |
| 2004/0244424 A1 * | 12/2004 | Tsuchiya | C03B 23/0254 65/370.1 |
| 2008/0096026 A1 * | 4/2008 | Yamada | B32B 17/10036 428/426 |
| 2009/0084138 A1 * | 4/2009 | Imaichi | C03B 23/023 65/106 |
| 2014/0065374 A1 * | 3/2014 | Tsuchiya | C03B 23/0252 428/174 |
| 2015/0202854 A1 * | 7/2015 | Tsuchiya | C03C 3/087 428/179 |
| 2015/0246839 A1 * | 9/2015 | Leveque | C03B 25/08 65/106 |

FOREIGN PATENT DOCUMENTS

| | | | | |
|---|---|---|---|---|
| JP | 2005-015326 A | 1/2005 | | |
| WO | WO-2012/137742 A1 | 10/2012 | | |
| WO | WO-2013/137154 A1 | 9/2013 | | |
| WO | WO-2014044516 A1 * | 3/2014 | ....... | B32B 17/10889 |
| WO | WO-2014/054468 A1 | 4/2014 | | |

\* cited by examiner

FIG.6A

| | GLASS COMPOSITION | PLATE THICKNESS mm | AMOUNT OF OVERLAPPING mm | SAG TIME RATIO (%) |
|---|---|---|---|---|
| OUTER PLATE | HIGH HEAT ABSORPTION GLASS | 2.0 | 9.6 | 107% |
| INNER PLATE | HIGH HEAT ABSORPTION GLASS | 2.0 | 9.4 | 100% |

FIG.6B

| | GLASS COMPOSITION | PLATE THICKNESS mm | AMOUNT OF OVERLAPPING mm | SAG TIME RATIO (%) |
|---|---|---|---|---|
| OUTER PLATE | HIGH HEAT ABSORPTION GLASS | 2.3 | 9.9 | 107% |
| INNER PLATE | GREEN GLASS | 1.8 | 9.6 | 100% |

FIG.6C

| | GLASS COMPOSITION | PLATE THICKNESS mm | AMOUNT OF OVERLAPPING mm | SAG TIME RATIO (%) |
|---|---|---|---|---|
| OUTER PLATE | GREEN GLASS | 2.0 | 17.2 | 117% |
| INNER PLATE | GREEN GLASS | 2.0 | 17.1 | 100% |

FIG.6D

| | GLASS COMPOSITION | PLATE THICKNESS mm | AMOUNT OF OVERLAPPING mm | SAG TIME RATIO (%) |
|---|---|---|---|---|
| OUTER PLATE | GREEN GLASS | 2.0 | 17.3 | 117% |
| INNER PLATE | GREEN GLASS | 1.6 | 16.8 | 100% |

FIG.6E

| | GLASS COMPOSITION | PLATE THICKNESS mm | AMOUNT OF OVERLAPPING mm | SAG TIME RATIO (%) |
|---|---|---|---|---|
| OUTER PLATE | GREEN GLASS | 2.0 | 16.6 | 100% |
| INNER PLATE | GREEN GLASS | 2.0 | 16.9 | 100% |

MANUFACTURING METHOD FOR LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/082529 filed on Nov. 19, 2015 and designating the U.S., which claims priority of Japanese Patent Application No. 2014-249700 filed on Dec. 10, 2014. The entire contents of the foregoing applications are incorporated herein by reference.

BACKGROUND OF THE INVENTION

1. Field of the Invention

The disclosure herein generally relates to a manufacturing method for a laminated glass in which a plurality of glass plates are laminated.

2. Description of the Related Art

Conventionally, for example, methods and apparatuses for manufacturing glass plates for a laminated glass in which two sheets of glass plates are laminated, used for a vehicle front windshield, by bending and forming each sheet, have been known (see, for example, Japanese Unexamined Utility Model Application Publication No. 3-78027 and U.S. Pat. No. 4,009,064). Generally, a glass for an inner plate that is arranged on an interior side of a vehicle (in the following, also referred to as "inner plate glass") and a glass for an outer plate that is arranged on an exterior side of the vehicle (in the following, also referred to as "outer plate glass"), when the laminated glass is formed, are different from each other in desired shapes required upon manufacturing.

In the related art disclosed in Japanese Unexamined Utility Model Application Publication No. 3-78027, when the inner plate glass is manufactured, the inner plate glass is bent and formed in a state where a dummy glass plate imitating the outer plate glass is attached to a shape forming surface. When the outer plate glass is manufactured, the outer plate glass is bent and formed in a state where a dummy glass plate imitating the inner plate glass is attached to the shape forming surface. Moreover in the related art disclosed in U.S. Pat. No. 4,009,064, an inner plate glass and an outer plate glass for a laminated glass are subjected to press forming separately by using forming dies that are different from each other.

SUMMARY OF THE INVENTION

However, in the related art disclosed in Japanese Unexamined Utility Model Application Publication No. 3-78027 and U.S. Pat. No. 4,009,064, when an inner plate glass and an outer plate glass for a laminated glass are bent and formed into desired shapes individually, dedicated forming dies are used, respectively. Therefore, a manufacturing apparatus for manufacturing a laminated glass by bending and forming individually an inner plate glass and an outer plate glass grows in size and becomes complicated. Then, a cost of the manufacturing apparatus and a manufacturing cost for the laminated glass increase.

The present invention is made in consideration of the above-described problem, and aims at providing a manufacturing method of a laminated glass, with a simple configuration, in which a plurality of glass plates for the laminated glass can be bent and formed into desired shapes individually so as to match with a need.

It is a general object of at least one embodiment of the present invention to provide a manufacturing method for a laminated glass that substantially obviates one or more problems caused by the limitations and disadvantages of the related art.

According to an aspect of the present invention, a manufacturing method for a laminated glass in which a plurality of glass plates are laminated, including a first main forming step of heating a first glass plate to a first softening point or higher to perform a main forming for the first glass plate; a second main forming step of heating a second glass plate to a second softening point or higher to perform the main forming for the second glass plate; a first finish forming step of bending and forming the first glass plate into a desired shape after the first main forming step; and a second finish forming step of bending and forming the second glass plate into a desired shape after the second main forming step, the first main forming step and the second main forming step being performed by using a same forming die, and a first condition for lowering a temperature of the first glass plate to below the first softening point and a second condition for lowering a temperature of the second glass plate to below the second softening point being different from each other, is provided.

According to an aspect of the present invention, with a simple configuration, a plurality of glass plates for a laminated glass can be bent and formed into desired shapes individually so as to match with a need.

BRIEF DESCRIPTION OF THE DRAWINGS

Other objects and further features of embodiments will become apparent from the following detailed description when read in conjunction with the accompanying drawings, in which:

FIGS. 6A to 6E are diagrams depicting examples of relations among a plate thickness, an amount of overlapping and a SAG time of an outer plate glass and an inner plate glass for the laminated glass according to the embodiment;

DETAILED DESCRIPTION OF THE PREFERRED EMBODIMENTS

In the following, with reference to drawings, embodiments of the manufacturing method for laminated glass according to the present invention will be described specifically.

Figure 1:
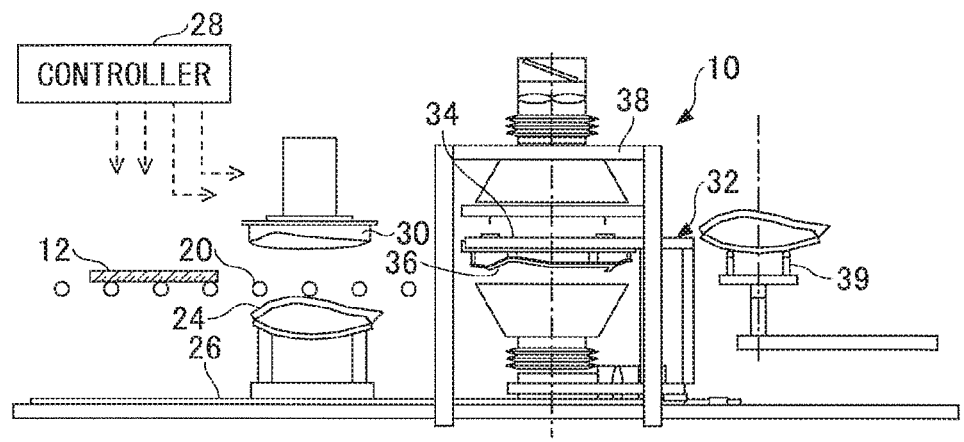
FIG. 1 is a configuration diagram depicting an example of a manufacturing apparatus for a laminated glass used for a manufacturing method for the laminated glass according to an aspect of the present invention.
Figure 2A:
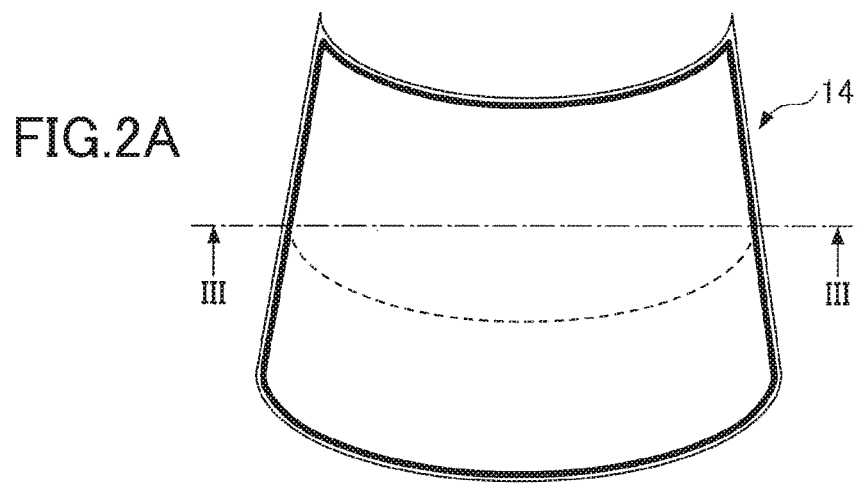
FIGS. 2A and 2B are configuration diagrams depicting an example of the laminated glass in which two sheets of glass plates are manufactured by the manufacturing apparatus for the laminated glass illustrated in FIG. 1.
Figure 2B:
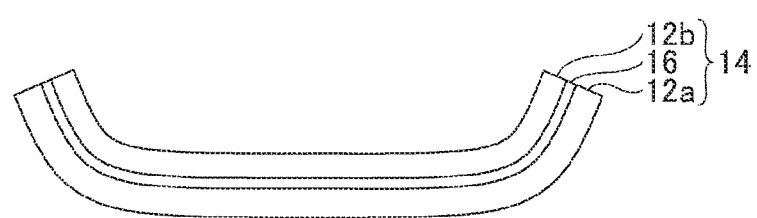
Figure 3A:
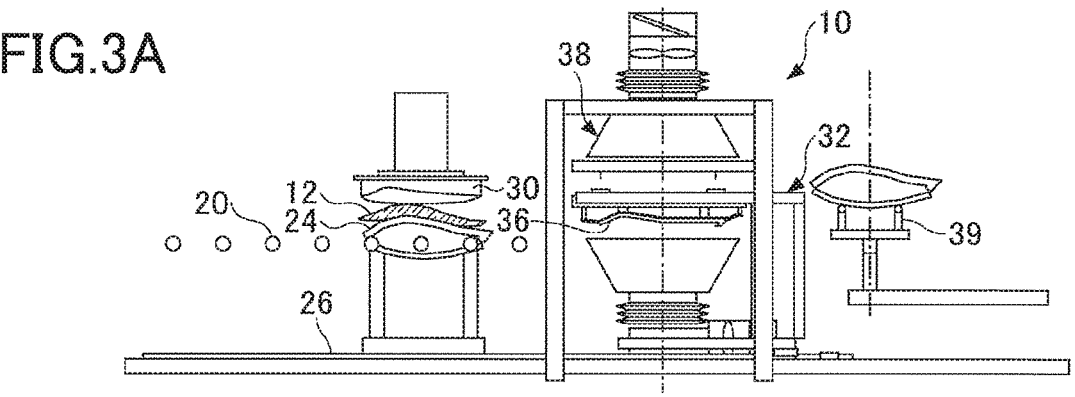
FIGS. 3A to 3D are diagrams for explaining an example of an operation procedure of the manufacturing apparatus for laminated glass illustrated in FIG. 1.
Figure 3B:
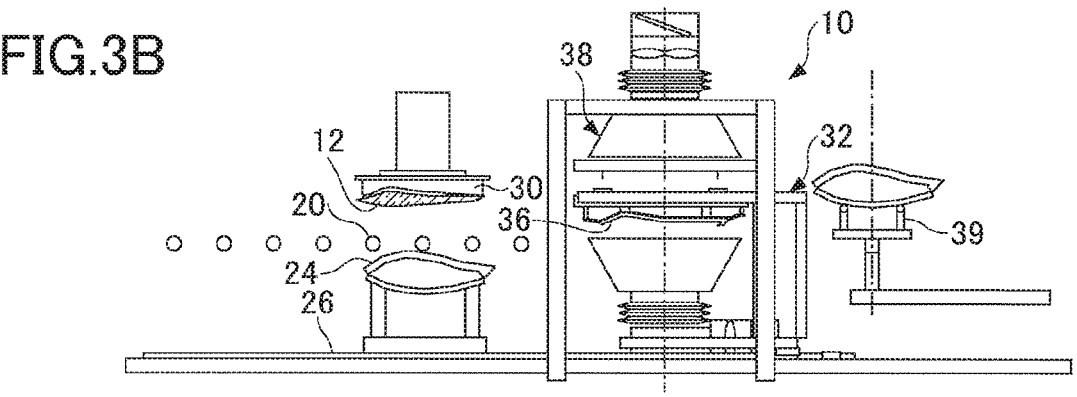
Figure 3C:
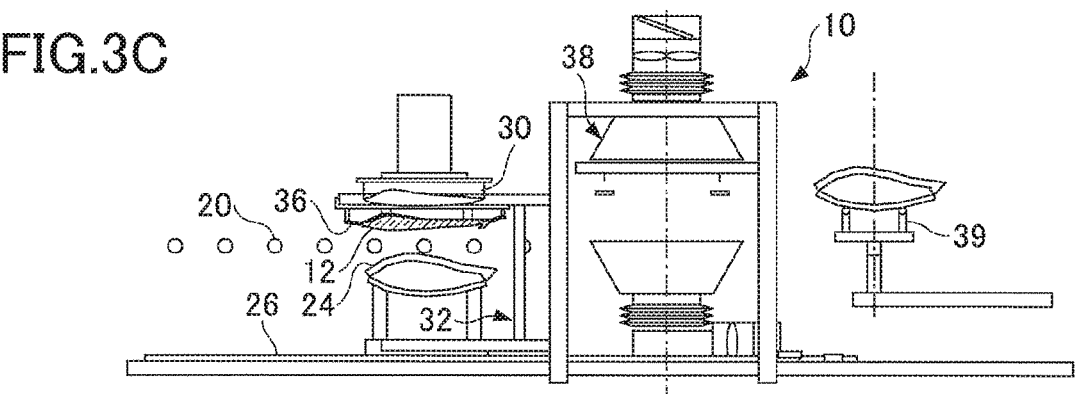
Figure 3D:
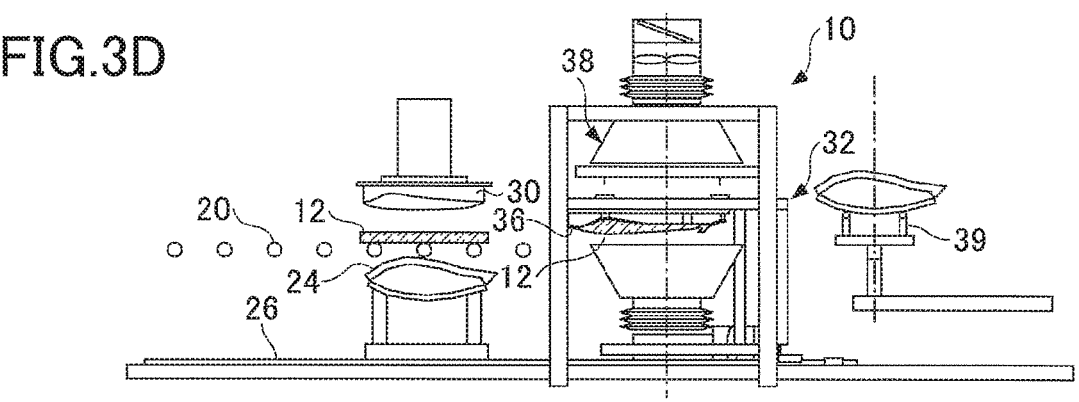

FIG. 1 is a configuration diagram depicting an example of a manufacturing apparatus 10 for a laminated glass used for a manufacturing method for the laminated glass according to an embodiment of the present invention. Moreover, FIGS. 2A and 2B are configuration diagrams depicting the laminated glass 14 in which two sheets of glass plates 12 manufactured by the manufacturing apparatus 10 for the laminated glass illustrated in FIG. 1. In FIGS. 2A and 2B, FIG. 2A is a perspective view of the laminated glass 14, and FIG. 2B is a cross-sectional view cut along a line on the laminated glass 14 illustrated in FIG. 2A.

The manufacturing apparatus 10 for laminated glass, illustrated in FIG. 1 (in the following, also referred to simply as a "manufacturing apparatus"), manufactures, for example, two glass plates 12 for a laminated glass 14 used for a front windshield of transport vehicle such as a car or a train, an architectural glass, or the like. The manufacturing apparatus 10 bends and forms each of two glass plates 12 so as to fit a required and desired shape from a plane shape.

In the embodiment, the laminated glass 14 includes an outer plate glass 12a arranged on a convex surface side (or outside) of a curved shape after forming, an inner plate glass 12b arranged on a concave surface side (or inside) of the curved shape after forming, and an intermediate film 16 intervening between the outer glass plate 12a and the inner glass plate 12b. The glass plate 12 can be formed of an inorganic glass, such as a soda-lime glass. Moreover, a functional coating film may be deposited on a surface of the glass plate 12 (i.e. at least one of the convex surface and the concave surface). For example, a function that the functional coating film has may be a heat ray reflection function, an antireflection function, low-E (low emission) function, or the like. The intermediate film 16 is formed of, for example, polyvinyl butyral, and may include a material for enhancing a noise barrier performance, a material for enhancing a heat ray reflectance, or the like. The outer plate glass 12a and the inner plate glass 12b may have configurations different from each other, plate thicknesses different from each other, or configurations different from each other and plate thicknesses different from each other.

In the following description, as a matter of convenience, the outer plate glass 12a will be referred to as a first glass plate, and the inner plate glass 12b will be referred to as a second glass plate. However, the first glass plate and the second glass plate are not limited to the above. That is, the first glass plate may be the outer plate glass 12a or the inner plate glass 12b. That is, the second glass plate indicates another glass plate different from one glass plate forming the first glass plate of the outer plate glass 12a and the inner plate glass 12b.

The glass plate 12 (specifically, the outer plate glass 12a and the inner plate glass 12b) may be bent and formed in a conveyance direction of the glass plate 12, or may be bent and formed in an orthogonal direction orthogonal to the conveyance direction. Furthermore, the glass plate 12 may be bent and formed in both the conveyance direction and the orthogonal direction. Moreover, the "conveyance direction" is a direction of the glass plate 12 during the manufacturing process flowing from an upstream side of the manufacturing process to a downstream side. Moreover, the "orthogonal direction" indicates a horizontal direction parallel to the ground among directions orthogonal to the conveyance direction of the glass plate 12 during the manufacturing process.

As illustrated in FIG. 1, the manufacturing apparatus 10 includes a controller 28, and a carrier conveyer 20 for conveying the heated and softened glass plate 12. The carrier conveyer 20 conveys a flat glass plate 12 and cut out into a predetermined shape, to a press area. The flat glass plate 12 cut out into a predetermined shape, is heated and softened to a temperature so that bending and forming can be performed (e.g. 600° C.-700° C.) by using a heater in a furnace or the like, and conveyed by the carrier conveyer 20. That is, the carrier conveyer 20 conveys the glass plate 12 that is heated in the furnace or the like and softened to the press area.

At a predetermined position in the press area, a female die 24 that is an example of a lower die for pressing is arranged. When the glass plate 12 is conveyed to the predetermined position, the female die 24 ascends from a standby position below the carrier conveyer 20 up to a predetermined ascending position. Therefore, when the glass plate 12 is conveyed to the predetermined position, the glass plate 12 is transferred from the carrier conveyer 20 to the female die 24 that has ascended to the ascending position.

The female die 24 supports the glass plate 12 from below. In the example, the female die 24 is a press ring formed in a shape of ring along an outline of the glass plate 12 so as to support a peripheral part (end surface or near the end surface) of the glass plate 12. A shape of upper surface of the female die 24 may support the entire circumference of the glass plate 12 or may support a part of the glass plate 12. Moreover, the shape of the upper surface of the female die 24 can correspond to the curved shape of the glass plate 12 that is bent and formed in the conveyance direction or the orthogonal direction.

Above the carrier conveyer 20 in the press area, a male die 30 is arranged. The male die 30 has a lower surface that is formed in a shape corresponding to a whole surface of the glass plate 12 that is bent and formed. In the example, the male die is a press mold formed in a downwardly convex shape. The shape of the lower surface of the male die 30 can correspond to the curved surface of the glass plate 12 that is bent and formed in the conveyance direction and the orthogonal direction. The male die 30 is hung inside the furnace or outside the furnace so that the male die 30 does not move in the horizontal direction in the press area, but can move vertically by an elevating device (not shown). The male die 30 can reciprocate vertically between the standby area and the press area in which the glass plate 12 is pressed and formed.

The female die 24 and the male die 30 are examples of a pair of dies in the configuration of a main forming pressing apparatus for pressing and forming the glass plate 12. The female die 24 and the male die 30 are arranged vertically across the carrier conveyer 20. The shape of the upper surface of the female die 24 and the shape of the lower surface of the male die 30 coincide with a predetermined common shape required for both the outer plate glass 12a and the inner plate glass 12b of the laminated glass 14. The predetermined common shape required for both the outer plate glass 12a and the inner plate glass 12b is a bending shape that is shallower than the desired shapes required for the respective outer plate glass 12*a* and inner plate glass 12*b*.

The female die 24 can move vertically between the standby position below the carrier conveyer 20 and the press position above the carrier conveyer 20. When the glass plate 12 is transferred from the carrier conveyer 20 to the female die at a predetermined ascending position, thereafter the female die 24 ascends from the predetermined ascending position to the press position above the carrier conveyer 20 in a state where the glass plate is placed.

On the lower surface of the male die 30, a lot of air vacuum holes are formed densely. The glass plate 12 is suctioned by the air vacuum via the air vacuum holes from the female die 24 side to the male die 30 side, and suctioned and held on the lower surface of the male die 30. The air vacuum is performed to the extent that the glass plate 12 can be lifted against the gravity and the glass plate 12 can be suctioned and held on the lower surface of the male die 30.

The manufacturing apparatus 10 is provided with a conveyance shuttle 32 on which the glass plate 12 that is pressed and formed is placed. The conveyance shuttle 32 includes a cooling die 36 that is attached and fixed to a base 34. The cooling die 36 supports the glass plate 12 from below. In the example, the cooling die 36 is a female die ring formed in a shape of ring along the outline of the glass plate 12 so as to support the peripheral part (end surface or near the end surface) of the glass plate 12. A shape of an upper surface of the cooling die 36 may support the entire circumference of the glass plate 12 or may support a part of the glass plate 12. Moreover, the shape of the upper surface of the cooling die 36 can correspond to the curved shape of the glass plate 12 that is bent and formed in the conveyance direction and the orthogonal direction.

The conveyance shuttle 32 can reciprocate on a rail 26 fixed to a hearth between the press area and a cooling area in which the glass plate 12 on the cooling die 36 of the conveyance shuttle 32 is cooled.

After the glass plate 12 is pressed and famed by the female die 24 and the male die 30 and suctioned and held on the lower surface of the male die 30, and the female die 24 descends to the standby position, the conveyance shuttle 32 is moved just below the male die 30 in the press area. The conveyance shuttle 32 can move and stop at a position where the cooling die 36 faces the male die 30 vertically (in the following, also referred to as a "facing position"). Moreover, the conveyance shuttle 32 can move and stop at a position where the cooling die 36 enters the cooling area (in the following, also referred to as a "cooling position"). That is, the conveyance shuttle 32 can move and stop at the facing position and the cooling position, respectively, and can reciprocate between the facing position and the cooling position.

The glass plate 12 suctioned and held on the lower surface of the male die 30 is transferred to the cooling die 36 of the conveyance shuttle 32 that is moved just below the male die 30. After the glass plate 12 is transferred from the male die 30 to the cooling die 36, the conveyance shuttle 32 conveys the glass plate 12 that is pressed and formed to the cooling area.

In the cooling area, cooling devices 38 are arranged vertically across the glass plate 12. The cooling devices 38 cool the glass plate 12 on the cooling die 36 by blowing cooling air on the glass plate 12 placed on the cooling die 36 of the conveyance shuttle 32. Blowoff timing for the cooling air by the cooling device 38 is controlled by the controller 28. The glass plate 12 that was cooled by the cooling device 38 is temporarily supported by a separation means such as a thrust rod, a hanger, or a lift jet (or separation mechanism, not shown).

The temporarily supported glass plate 12 is transferred to a die included in a shuttle for discharge 39 that enters the cooling area after the conveyance shuttle 32 retreats to the press area. The shuttle for discharge 39 conveys the glass plate 12 to the carrier conveyer 20 and an inspection area, after the glass plate supported by the separation means is transferred to the die included in the shuttle for discharge 39.

Next, an example of an operation of the manufacturing apparatus 10 illustrated in FIG. 1 will be described with reference to FIGS. 3A to 3D. FIGS. 3A to 3D are diagrams for explaining an example of an operation procedure of the manufacturing apparatus 10 illustrated in FIG. 1.

In the manufacturing apparatus 10, manufacturing of the outer plate glass 12*a* and the inner plate glass 12*b* for the laminated glass is controlled by the controller 28. The laminated glass 14 is manufactured individually, described as follows. First, the flat glass plate 12 cut out into a predetermined shape, that forms the laminated glass 14, is individually conveyed to the press area by the carrier conveyer 20. The carrier conveyer 20 conveys the glass plate 12 to a predetermined position in the press area. When the glass plate 12 is conveyed to the predetermined position, the female die 24 ascends from below the carrier conveyer 20, to support the glass plate 12 from below. Among FIGS. 3A to 3D, FIG. 3A depicts the manufacturing apparatus 10 in this state.

When the female die 24 supports the glass plate 12 from below, the elevating device causes the male die 30 to descend so that the male die 30 presses and forms the glass plate 12 on the female die 24 thereafter. When the male die 30 descends, the glass plate 12 on the female die 24 is held between the female die 24 and the male die 30, and is pressed. When the pressing is performed, the glass plate 12 is pressed and famed into a predetermined shape that is a bending shape shallower than the desired shape that is required.

When the glass plate 12 is pressed and formed, the outer plate glass 12*a* has been heated to the softening point of the outer plate glass 12*a* (also referred to as the "first softening point") or more. Moreover the inner plate glass 12*b* has been heated to the softening point of the inner plate glass 12*b* (also referred to as the "second softening point") or more. The first softening point may be the same as the second softening point, or different from the second softening point. The first softening point and the second softening point may be determined depending on compositions, moisture contents, or the like of the outer plate glass 12*a* and the inner plate glass 12*b*.

When the pressing and forming of the glass plate 12 by the female die 24 and the male die 30 are completed, the male die 30 ascends by the elevating device. When the male die 30 ascends, the male die 30 suctions and holds the glass plate 12 that is pressed and formed by the air vacuum via the air vacuum holes. Therefore, the glass plate that is pressed and formed ascends in a state of being suctioned and held on the lower surface of the male die 30. When the male die 30 reaches a predetermined ascending position, the male die 30 stops in the state where the glass plate 12 is suctioned and held on the lower surface of the male die 30. Accordingly, the glass plate 12 does not ascend beyond the predetermined ascending position.

When the male die 30 ascends with the glass plate 12 suctioned and held on the lower surface of the male die 30, thereafter, the female die 24 descends to the standby position below the carrier conveyer 20 and stops. Among FIGS. 3A to 3D, FIG. 3B depicts the manufacturing apparatus 10 in this state. Moreover, the male die 30 ascends to the ascending position and stops, thereafter the conveyance shuttle 32 moves from the cooling position toward the facing position at which the cooling die 36 vertically faces the male die 30. The conveyance shuttle 32 transfers to the facing position, and stops.

When the conveyance shuttle 32 transfers to the facing position and stops, the cooling die 36 faces the male die 30 vertically. Thereafter, the suctioning and holding of the glass plate 12 on the male die 30 by the air vacuum is released. When the suctioning and holding of the glass plate 12 is released, the glass plate 12 suctioned and held on the lower surface of the male die 30 is transferred from the lower surface of the male die 30 onto the cooling die 36 of the conveyance shuttle 32. Among FIGS. 3A to 3D, FIG. 3C depicts the manufacturing apparatus 10 in this state.

When the glass plate 12 is transferred onto the cooling die 36 of the conveyance shuttle 32, thereafter, the conveyance shuttle 32 moves from the facing position at which the cooling die 36 vertically faces the male die 30 toward the cooling position. The conveyance shuttle 32 moves to the cooling position and stops. Among FIGS. 3A to 3D, FIG. 3D depicts the manufacturing apparatus 10 in this state.

When the conveyance shuttle 32 moves to the cooling position and stops, the cooling device 38 cools the glass plate 12 placed on the cooling die 36 of the conveyance shuttle 32 with a cooling air. The cooling with a cooling air is performed until the glass plate 12 on the cooling die 36 is cooled to less than the softening point. When the glass plate 12 is cooled in this way, the glass plate 12 stops deformation. The glass plate 12 can deform by its dead weight from when the cooling by the cooling device 38 starts until the temperature descends to less than the softening point.

When the cooling of the glass plate 12 completes, described as above, the glass plate 12 is separated from the cooling die 36 by the separation means, and is temporarily supported by the separation means. Thereafter, the conveyance shuttle 32 retreats to the press area. After the conveyance shuttle 32 retreats to the press area, the shuttle for discharge 39 enters the cooling area, and the glass plate 12 temporarily supported by the separation means is transferred onto a die of the shuttle for discharge 39. When the glass plate 12 is transferred to onto the die of the shuttle for discharge 39, thereafter, the shuttle for discharge 39 is discharged to the carrier conveyer 20 and the inspection area.

When the outer plate glass 12a and the inner plate glass 12b for the laminated glass 14 are manufactured by being individually bent and formed, thereafter the intermediate film 16 is inserted between the outer plate glass 12a and the inner plate glass 12b, the intermediate film 16 is pressure bonded by using a publicly known method, and thereby the laminated glass 14 is manufactured.

In this way, in the embodiment, the outer plate glass 12a and the inner plate glass 12b for the laminated glass 14 are manufactured by individually being shaped after being heated and softened, and cooled. The outer plate glass 12a and the inner plate glass 12b for the laminated glass 14 are press formed by using the same press forming die (specifically, the female die 24 and the male die 30), and cooled by using the same cooling device 38.

It should be noted that the outer plate glass 12a and the inner plate glass 12b for the laminated glass 14 may be formed respectively into desired shapes different from each other. For example, taking into account a structure of the laminated glass 14 itself, the desired shape required for the outer plate glass 12a has a greater curvature radius compared with the desired shape required for the inner plate glass 12b. In other words, the desired shape required for the inner plate glass 12b has a smaller curvature radius compared with the desired shape required for the outer plate glass 12a. In order to enhance assemblability upon forming the laminated glass 14 by laminating the outer plate glass 12b and the inner plate glass 12a, the desired shape required for the outer plate glass 12a preferably has a relatively small curvature radius, and the desired shape required for the inner plate glass 12b preferably has a relatively great curvature radius.

In this way, the outer plate glass 12a and the inner plate glass 12b for the laminated glass 14 may be formed so that amounts of overlapping W of the outer plate glass 12a and the inner plate glass 12b are different from each other. The amount of overlapping W may be referred to as the maximum cross curvature, and when the convexly curved laminated glass is arranged so that the convex part of the laminated glass faces downward, and middle points of a pair of long sides, respectively, of the laminated glass that face each other are connected with a straight line, the amount of overlapping W is defined as a length of a perpendicular to the straight line from a deepest point of a bottom part of a curved portion.

Moreover, even when the outer plate glass 12a and the inner plate glass 12b for the laminated glass 14 are formed so that the amounts of overlapping W of the outer plate glass 12a and the inner plate glass 12b are approximately the same, the outer plate glass 12a and the inner plate glass 12b may be formed with plate thicknesses different from each other. Furthermore, the outer plate glass 12a and the inner plate glass 12b may be formed under at least one condition of the compositions being different from each other, the plate thicknesses being different from each other, and shielding layers that cover peripheral part of glass being different from each other.

In the embodiment, as described above, the glass plates 12 deform by their dead weight after the press forming is completed, until the cooling by the cooling device 38 starts, or until the temperature of the glass plates 12 descends to less than the softening point, in the state of being placed on the cooling die 36 of the conveyance shuttle 32. In this way, the glass plate 12 deforms by its dead weight according to the condition after the press forming is completed until the cooling starts (or the temperature descends to less than the softening point).

For example, the longer the time after the press forming is completed until the cooling starts is, the greater the defamation of the glass plate 12 by its dead weight progresses, and the glass plate 12 is bent deeply. The ease of bending of the glass plate 12 by its dead weight may vary depending on the above-described various conditions. The ease of bending of the glass plate 12 by its dead weight varies depending on various factors of the glass plate 12, such as a composition, a plate thickness, a pattern of the shielding layer, or presence or absence of a functional coating film. For example, the thicker the plate thickness of the glass plate 12 is, the more easily the deformation by its dead weight sometimes progresses due to its greater weight. However, even if the plate thickness is great, depending on the composition or the shape of the glass plate 12, the deformation of the glass plate 12 by its dead weight may be difficult to progress.

For example, when the outer plate glass 12a and the inner plate glass 12b have the same composition, the same pattern of shielding layer, a similarity of shapes or the same shape, and the plate thickness of the outer plate glass 12a is smaller than the plate thickness of the inner plate glass 12b, the time after the completion of the press forming until the start of cooling for the outer plate glass 12a can be made shorter than the time after the completion of the press forming until the start of cooling for the inner plate glass 12b. According to the above-described configuration, both the glass plates 12a, 12b can be bent and formed into a desired shape adopting the need, respectively, and the formation time can be shortened.

As described above, in the manufacturing apparatus 10 in which the outer plate glass 12a and the inner plate glass 12b for the laminated glass 14 are pressed and formed by using the same press forming dies (specifically, the female die 24 and the male die 30), when the condition for causing the temperature of the glass plate 12, for which the press formation is completed, to descend to a temperature less than the softening point, is the same for both the outer plate glass 12a and the inner plate glass 12b without the distinction between the outer plate glass 12a and the inner plate glass 12b, it is difficult to bend and form both the outer plate glass 12a and the inner glass plate 12b into the desired shapes required for the respective glass plates.

Then, in the embodiment, the plurality of glass plates 12 for the laminated glass 14 are pressed and formed individually by using the same press forming die, but the condition for causing the temperature of the glass plate 12, for which the press formation is completed in a state of being heated at a predetermined temperature capable of being bent and formed, to descend to a temperature less than the softening point is changed for each glass plate 12. According to the above-described configuration, both the outer plate glass 12a and the inner plate glass 12b can be bent and formed into the desired shapes required for the respective glass plates.

Specifically, depending on whether the glass plate 12 to be manufactured is for the outer plate glass 12a or for the inner plate glass 12b, the time after the completion of the press forming until the start of cooling by the cooling apparatus 38 (in the following, also referred to as a "SAG time" T) is changed. During the SAG time T, the glass plate 12 is maintained at a temperature which is the softening point or higher, and can deform by its dead weight. The bending and forming of the glass plate 12 ends when the cooling starts and the temperature of the glass plate 12 descends to less than the softening point.

Figure 4:
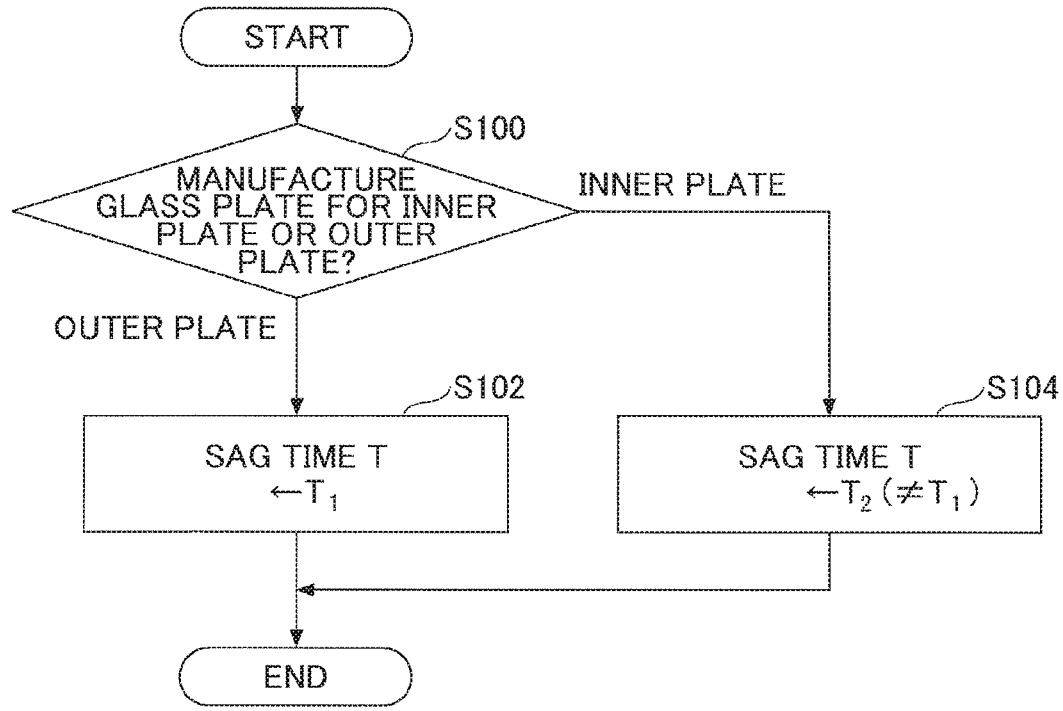
FIG. 4 is a flowchart for explaining an example of a control routine that is executed in the manufacturing apparatus for laminated glass illustrated in FIG. 1.
Figure 5:
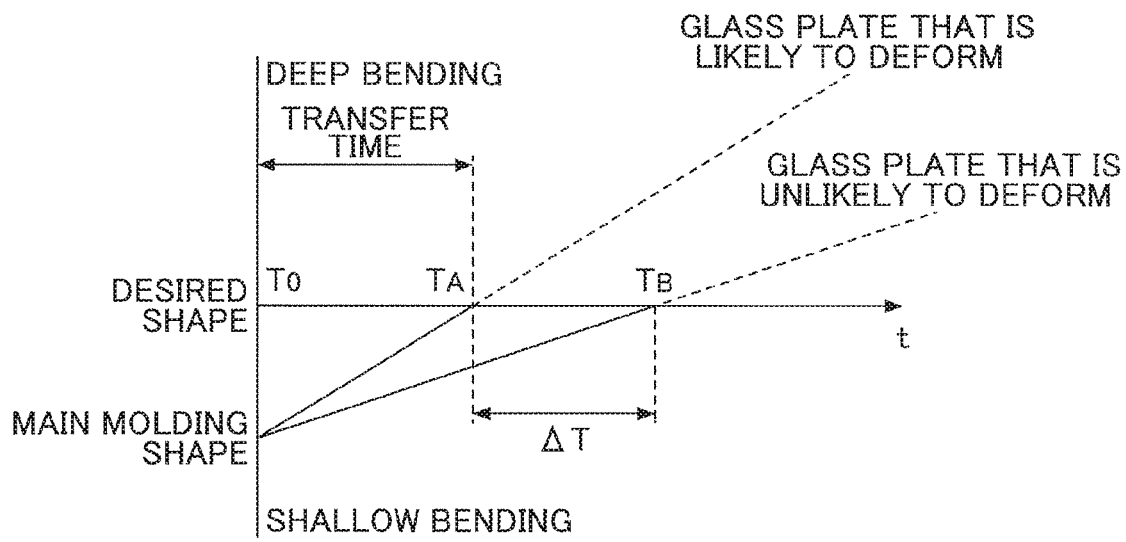
FIG. 5 is a diagram depicting an example of time variations of amounts of bending after main forming processes end for two glass plates whose deformabilities are different from each other.

FIG. 4 is a flowchart for explaining an example of a control routine executed by the controller 28 in the manufacturing apparatus 10 illustrated in FIG. 1. FIG. 5 is a diagram depicting an example of time variations of respective amounts of bending after completion of the press forming for two glass plates whose deformabilities are different from each other.

In FIG. 5, the vertical axis and the horizontal axis indicate the amount of deformation and the SAG time in arbitrary units, respectively. Moreover, $T_0$ indicates the time at which the press formation (main formation) into the same shape is completed, irrespective of the deformability of the glass plate 12. After the completion of the press formation, through a standby time for performing transfer or the like that is unavoidable on a process, the deformation due to the SAG is completed almost simultaneously with the start of cooling at a time point $T_A$, and thereby the bending and forming of the glass plate 12 (e.g. the outer plate glass 12a) that is liable to deform due to its dead weight are completed. For the glass plate 12 that is difficult to deform by its dead weight (e.g. the inner plate glass 12b), the bending and forming are not sufficient at the time point $T_A$, and the desired shape has not been famed. Then, the SAG time is extended by $\Delta T$ until the desired shape is formed. In this case, the SAG time is $T_B$ (=$T_A \Delta T$).

The method of changing the above-described SAG time T is not particularly limited. The SAG time T can be changed, for example, by changing a duration time in which the glass plate 12, for which the press formation is completed, is suctioned and held on the lower surface of the male die 30 (i.e. a time after the completion of the press formation of the glass plate 12 until the glass plate 12 is transferred from the lower surface of the male die 30 to the cooling die 36 of the conveyance shuttle 32); a moving speed that the conveyance shuttle 32 having the cooling die 36 on which the glass plate 12, for which the press formation is completed, is plated moves from the facing position toward the cooling position; a time after the conveyance shuttle 32 stops moving at the cooling position until the cooling device 38 starts cooling for the glass plate 12 on the cooling die 36, or the like.

In this way, as illustrated in FIG. 4, upon manufacturing the glass plate 12 for the laminated glass 14, the controller 28 first determines whether the glass plate 12 to be manufactured is for the outer plate glass 12a or for the inner plate glass 12b (step S100). When the glass plate 12 to be manufactured is determined to be for the outer plate glass 12a, the above-described SAG time T is set to the SAG time $T_1$ for the outer plate glass 12a (step S102). When the glass plate 12 to be manufactured is determined to be for the inner plate glass 12b, the above-described SAG time T is set to the SAG time $T_2$ for the inner plate glass 12b (step S104). After step S102 or step S104, the control routine ends.

The SAG time $T_1$ for the outer plate glass 12a and the SAG time $T_2$ for the inner plate glass 12b only have to be set in advance so as to be different from each other, and only have to be stored on the controller 28 side. Moreover, the SAG times $T_1$, $T_2$ only have to be set for the case where the glass plate 12 is heated at a predetermined temperature (e.g. 625° C.) at which the glass plate 12 can be bent and formed. Furthermore, the SAG times $T_1$, $T_2$ may vary depending on the predetermined temperature. Furthermore, the SAG times $T_1$, $T_2$ only have to be set according to ease of deformation, such as a desired shape, a plate thickness, or a composition.

For example, when the outer plate glass 12a and the inner plate glass 12b are formed with the same composition (e.g. soda-lime glass), and the plate thicknesses of both the glass plates 12a, 12b are the same, but the desired shapes required for the respective glass plates 12a, 12b (specifically, shapes required after completion of cooling and before laminating) are different from each other, the SAG times $T_1$, $1_2$ are set according to the desired shapes required for the respective glass plates 12a, 12b.

Moreover, for example, when the plate thickness of the outer plate glass 12a and the plate thickness of the inner plate glass 12b are different from each other, the SAG times $T_1$, $T_2$ are set according to ease of deformation depending on the plate thicknesses and the compositions, and the shapes of the glass plates 12a, 12b, respectively. In this case, when the desired shape required for the outer plate glass 12a and the desired shape required for the inner plate glass 12b are the same, and the inner plate glass 12b is more difficult to deform than the outer plate glass 12a, e.g. as illustrated in FIG. 5, the SAG time $T_2$ of the inner plate glass 12b with the plate thickness thinner than the outer plate glass 12a is set longer than the SAG time $T_1$ of the outer plate glass 12a with the plate thickness thicker than the inner plate glass 12b by the predetermined time $\Delta T$. Furthermore, for example, when the composition of the outer plate glass 12a and the composition of the inner plate glass 12b are different from each other, the SAG time $T_1$, $T_2$ are set according to the compositions of the glass plates 12a, 12b, respectively. When the glass plates 12a, 12b are influenced by the pattern of the shielding layer or the functional coating film, the SAG times $T_1$, $T_2$ are set to values taking into account the influence by the pattern of the shielding layer or the functional coating film.

FIGS. 6A to 6E are diagrams depicting examples of relations among a plate thickness, an amount of overlapping and a SAG time of an outer plate glass 12a and an inner plate glass 12b for the laminated glass 14 according to the embodiment. Any of FIGS. 6A to 6E depicts an example of a result of measurement in the case of using a glass plate in which a float glass having a soda-lime glass composition that is used for a glass for vehicle as a general-purpose use is used, but a functional coating film such as heat reflecting is not present on a surface.

Figure 7:
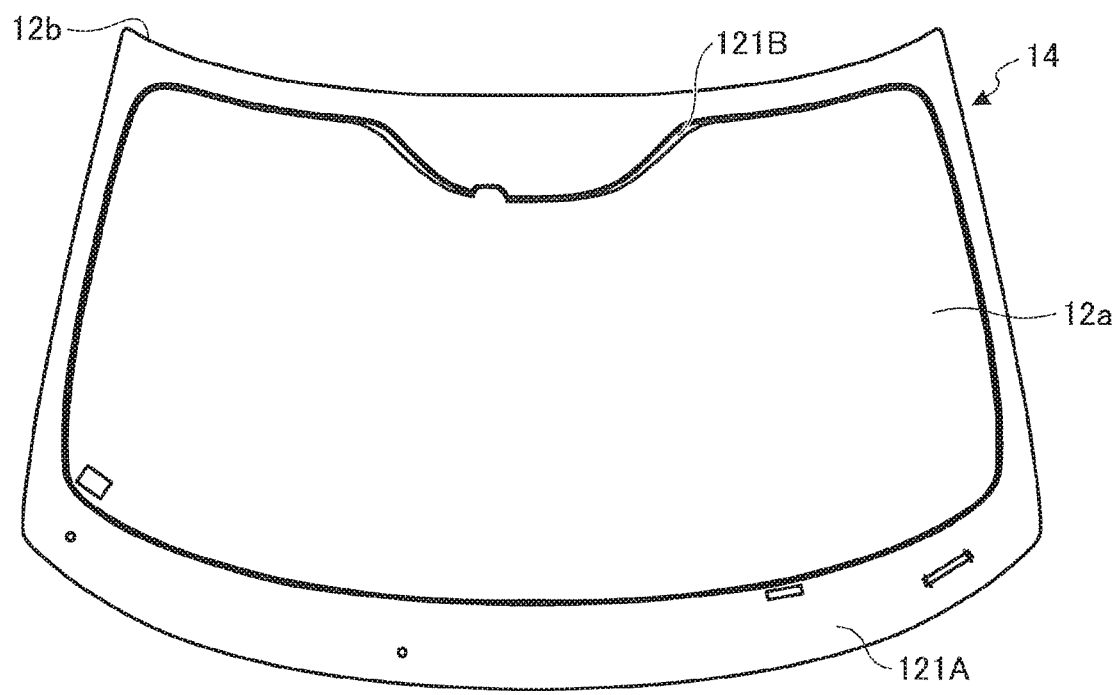
FIG. 7 is a front view depicting an example of the outer plate glass and the inner plate glass having almost the same pattern of shielding layers, overlapping with each other.

Among FIGS. 6A to 6E, FIG. 6A illustrates Example 1. In Example 1, both the outer plate glass 12a and the inner plate glass 12b are famed of a high heat absorption glass containing high iron, have the same plate thickness, and have approximately the same pattern of shielding layer, as illustrated in FIG. 7. FIG. 6A indicates a SAG time ratio at which both the glass plates 12a, 12b have desired amounts of overlapping. FIG. 7 is a front view depicting an example of the outer plate glass 12a and the inner plate glass 12b having almost the same pattern of shielding layers, overlapping with each other. In this example, because the ease of bending of the outer plate glass 12a is almost the same as the ease of bending of the inner plate glass 12b, in order to obtain the desired curvature radius and the desired amount of overlapping, the SAG time for the outer plate glass 12a is extended and set to 107% of the SAG time for the inner plate glass 12b. In this way, by making the SAG time for the outer plate glass 12a greater than the SAG time for the inner plate glass 12b, appropriate amounts of overlapping can be obtained. In FIG. 7, on the outer plate glass 12a, for example, a pattern of a shielding layer of black ceramic 121A is formed. On the inner plate glass 12b, for example, a pattern of a shielding layer of black ceramic 121B is formed.

Among FIGS. 6A to 6E, FIG. 6B illustrates Example 2. In Example 2, the outer plate glass 12a formed of the high heat absorption glass containing high iron and the inner plate glass 12b formed of a green glass have plate thicknesses different from each other, but have approximately the same pattern of shielding layer as illustrated in FIG. 7. FIG. 6B indicates a SAG time ratio at which both the glass plates 12a, 12b have desired amounts of overlapping. In this example, because the outer plate glass 12a is more difficult to bend than the inner plate glass 12b, in order to obtain the desired curvature radius and the desired amount of overlapping, the SAG time for the outer plate glass 12a is extended, and set to 107% of the SAG time for the inner plate glass 12b.

Figure 8:
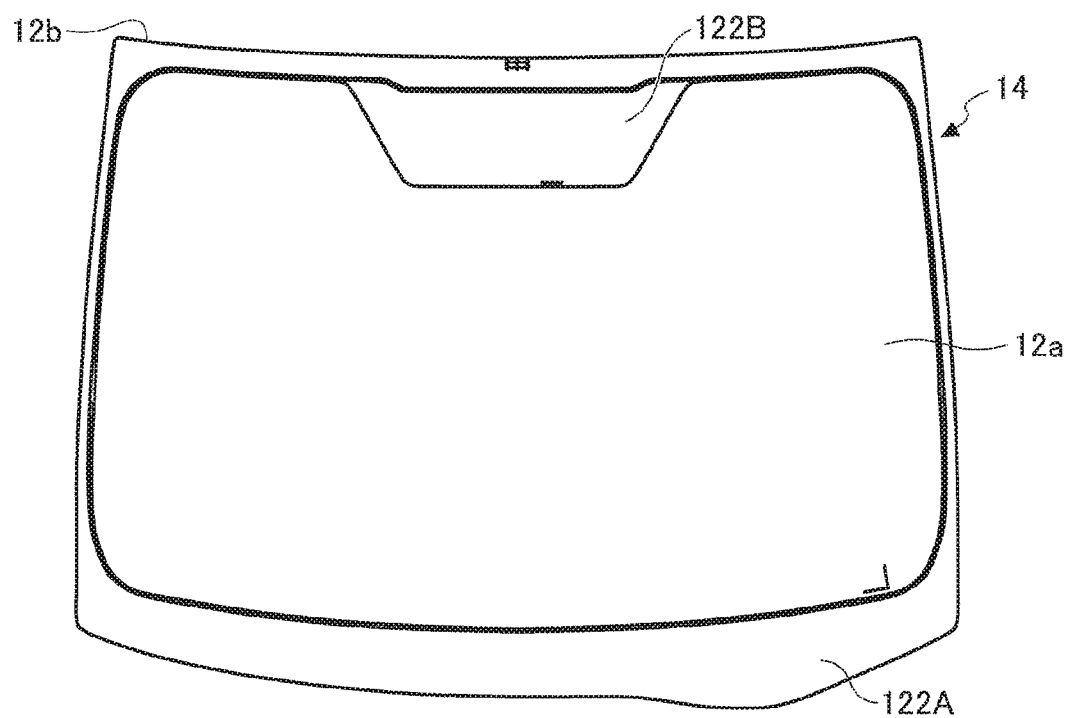
FIG. 8 is a front view depicting an example of the outer plate glass and the inner plate glass having patterns of shielding layers with shapes different from each other, overlapping with each other.

Among FIGS. 6A to 6E, FIG. 6C illustrates Example 3. In Example 3, both the outer plate glass 12a and the inner plate glass 12b are famed of the green glass, have the same plate thickness, but have the patterns of shielding layers with different shapes, as illustrated in FIG. 8. FIG. 6C indicates a SAG time ratio at which both the glass plates 12a, 12b have desired amounts of overlapping. FIG. 8 is a front view depicting an example of the outer plate glass 12a and the inner plate glass 12b having the patterns of shielding layers with different shapes from each other, overlapping with each other. In this example, because the outer plate glass 12a is more difficult to bend than the inner plate glass 12b, in order to obtain the desired curvature radius and the desired amount of overlapping, the SAG time for the outer plate glass 12a is extended and set to 117% of the SAG time for the inner plate glass 12b. In FIG. 8, on the outer plate glass 12a, for example, a pattern of a shielding layer of black ceramic 122A is formed. On the inner plate glass 12b, for example, a pattern of a shielding layer of black ceramic 122B is formed.

Among FIGS. 6A to 6E, FIG. 6D illustrates Example 4. In Example 4, both the outer plate glass 12a and the inner plate glass 12b are famed of the green glass, have different plate thicknesses, and have the patterns of shielding layers with different shapes, as illustrated in FIG. 8. FIG. 6D indicates a SAG time ratio at which both the glass plates 12a, 12b have desired amounts of overlapping. In this example, because the outer plate glass 12a is more difficult to bend than the inner plate glass 12b, in order to obtain the desired curvature radius and the desired amount of overlapping, the SAG time for the outer plate glass 12a is extended and set to 117% of the SAG time for the inner plate glass 12b.

Among FIGS. 6A to 6E, FIG. 6E illustrates Comparative Example that is compared with Examples 1 to 4 illustrated in FIGS. 6A to 6D. In Comparative Example, both the outer plate glass 12a and the inner plate glass 12b are formed of the green glass, have the same plate thickness, but have the patterns of shielding layers with different shapes, as illustrated in FIG. 8. FIG. 6E indicates amounts of overlapping of the glass plates 12a, 12b in the case where the SAG time does not change different from the embodiment. In this example, because the SAG times for the glass plates 12a, 12b are not changed, the amount of overlapping of the inner plate glass 12b is greater than the amount of overlapping of the outer plate glass 12a.

The desired shape of the outer plate glass 12a is not necessarily the same as the desired shape of the inner plate glass 12b. Generally, a bent depth represented by the amount of overlapping of the outer plate glass 12a is preferably slightly greater than that of the inner plate glass 12b. According to the above-described configuration, it becomes possible to prevent cracking in a lay-up process, a pressure bonding process or the like, upon combining both the above-described glass plates 12a, 12b to manufacture the laminated glass 14, enhance the deaeration, and enhance the adhesion between the glass 12 and the intermediate film 16 of the laminated glass 14.

According to the embodiment, by changing or adjusting a SAG time T after completion of press formation until cooling by a cooling device 38 starts for each an outer plate glass 12a and an inner plate glass 12b for a laminated glass 14, even when at least one of a desired shape, a plate thickness, a composition, and a shielding layer pattern, which are required for the both glass plates 12a, 12b, is different between the both glass plates 12a, 12b, it is possible to manufacture both the glass plates 12a, 12b individually, and bend and form each of both the glass plates 12a, 12b into a desired shape according to request.

As described above, the outer plate glass 12a and the inner plate glass 12b for the laminated glass 14 are pressed and formed by using the same press forming die (specifically, the female die 24 and the male die 30). Therefore, according to the manufacturing apparatus 10 used in the embodiment, even when at least one of the desired shape, the plate thickness, the composition, and the shielding layer pattern, which are required for the both glass plates 12a, 12b, is different between the both glass plates 12a, 12b, it is possible to press and form both the glass plates 12a, 12b individually using the same press forming die, and bend and form each of both the glass plates 12a, 12b into the desired shape according to request.

That is, even when at least one of the desired shape, the plate thickness, the composition and the shielding layer pattern, which are required for the outer glass plate 12a and the inner glass plate 12b for the laminated glass 14, is different between both the glass plates 12a, 12b, it is possible to use the press forming die that is common between both the glass plates 12a, 12b for bending and forming each of both the glass plates 12a, 12b into the desired shape according to the request.

According to the embodiment, without causing enlargement, without causing complication, and without increasing costs of the manufacturing apparatus 10, with a simple configuration, it is possible to bend and form the outer plate glass 12a and the inner plate glass 12b for the laminated glass 14 individually into a desired shape according to request. Therefore, it is possible to overlap the outer plate glass 12a and the inner plate glass 12b that satisfy a required accuracy with each other, to manufacture a laminated glass 14 with high accuracy.

Moreover, in the embodiment, bending and forming of the outer plate glass 12a and the inner plate glass 12b for the laminated glass 14 are performed one by one. Therefore, according to the embodiment, it is possible to reduce flaws generated on the surfaces between the respective glass plates 12a, 12b, compared with the case of laminating both the glass plates 12a, 12b to form the laminated glass and bending and forming the laminated glass at a time.

It should be noted that in the embodiment, the female die 24 and the male die 30 are examples of a "same forming die". Moreover, the outer plate glass 12a is an example of a "first glass plate", and the inner plate glass 12b is an example of a "second glass plate". The processes of pressing and forming the outer plate glass 12a and the inner plate glass 12b using the female die 24 and the male die 30 are examples of a "first main forming process" and a "second main forming process", respectively. Moreover, the processes of bending and forming both the glass plates 12a, 12b into desired shapes according to request by making the SAG times T for the glass plates 12a, 12B different from each other are examples of a "first finish forming process" and a "second finish forming process". The process of cooling the glass plate 12 bent and formed into the desired shape that is required using the cooling device 38 is an example of a "cooling process". The SAG time T upon forming the outer plate glass 12a is an example of a "first condition" and a "first time period", and the SAG time T upon forming the inner plate glass 12b is an example of a "second condition" and a "second time period". Moreover, the cooling die is an example of a "conveyance die".

The present invention is not limited to the specific examples illustrated in the embodiment. However, a person skilled in the art can make variations and modifications of the embodiment based on the specific examples.

In the embodiment, the outer plate glass 12a and the inner plate glass 12b for the laminated glass 14 are pressed and formed as a main forming by using the same forming die. However, the present invention is not limited to this. The forming may be performed without distinguishing the outer plate glass 12a and the inner plate glass 12b. For example, as the main forming, a main forming method other than the press forming, such as a gravity forming may be used.

Moreover, in the embodiment, the outer plate glass 12a and the inner plate glass 12b for the laminated glass 14 may be manufactured by conveying alternately by a prescribed number of sheets in order. For example, the outer plate glass 12a and the inner plate glass 12b may be manufactured alternately by one sheet, i.e. an outer plate glass 12a for a first laminated glass 14, an inner plate glass 12b for the first laminated glass 14, an outer plate glass 12a for a second laminated glass 14, an inner plate glass 12b for the second laminated glass 14, . . . , in this order. Moreover, the outer plate glass 12a and the inner plate glass 12b may be manufactured alternately by two sheets, i.e. an outer plate glass 12a for a first laminated glass 14, an inner plate glass 12b for the first laminated glass 14, an inner plate glass 12b for a second laminated glass 14, an outer plate glass 12a for the second laminated glass 14, an outer plate glass 12a for a third laminated glass 14, an inner plate glass 12b for the third laminated glass in this order.

In this way, by alternately conveying glass plates by a prescribed number of sheets, the management of base plate glass (flat sheet glass) before forming becomes simple. For example, it becomes possible to place base plate glass for outer plates on a pallet, place base plate glass for inner plates on another pallet, and form the respective glass plates at once. By forming a glass plate group for outer plates first and forming a glass plate group for inner plates afterward, a work of transshipment to pallet or the like can be reduced.

Moreover, by manufacturing glass plates alternately by one sheet, the glass plates can be combined into a laminated glass just after the first finish forming and the second finish forming. In this case, by a process using the same forming die, a laminated glass can be manufactured continuously.

Moreover, in the embodiment, the outer plate glass 12a and the inner plate glass 12b for the laminated glass 14 may be manufactured in no particular order. In this case, depending on the conveyed flat sheet glass plate, while changing the first condition and the second condition, the glass plates 12 can be manufactured. According to the above-described configuration, irrespective of whether base plate glass for outer plate is placed on the pallet or base plate glass for inner plate is placed on the pallet, the glass plate 12 can be formed continuously.

Moreover, in the embodiment, the respective glass plates 12 for the laminated glass 14 may be press formed and the glass plates 12 may be transferred from the press area, in which the press formation is performed, to the cooling die 36 inside a furnace that is heated by using a heater or the like. According to this variation, because the glass plate 12 is press formed inside the furnace, it becomes possible to prevent the glass plate 12 during being press formed and the glass plate 12 just after the press formation from becoming difficult to be cooled. As a result, the glass plate 12 can be prevented from being difficult to be bent and formed due to the temperature decrease. In the variation, the heater only has to be arranged on a ceiling, a side wall or a floor surface of the furnace. Moreover, the temperature applied to the glass plate 12 may be variable according to a composition, a shape, a size, a thickness or the like of the glass plate 12 that is bent and formed.

The respective glass plates 12 for the laminated glass 14 may be press formed and the glass plates 12 may be transferred from the press area, in which the press formation is performed, to the cooling die 36 outside the furnace that is heated by using the heater or the like. According to this variation, because the glass plate 12 is press formed outside the furnace, the heat resistance of the press forming die, with which the glass plate 12 is press formed, can be reduced. As a result, the configuration of the press forming die can be prevented from becoming complicated. This variation is preferably applied to the case where the desired shape required for the glass plate 12 is a shallowly bent shape with a small amount of forming.

Moreover, in the variation, a heating device, such as a heater may be arranged in order to prevent the glass plate 12 from becoming liable to be cooled after heating and softening, before the press formation, or during the press formation. That is, the first main forming process and the second main forming process may be performed while heating the first glass plate and the second glass plate. According to this variation, because the configuration of the press forming die can be prevented from becoming complicated and the glass plate 12 to be pressed and formed can be prevented from becoming difficult to be bent and formed due to the temperature decrease, this variation can be applied also to the case where the desired shape required for the glass plate 12 is a deeply bent shape with a great amount of forming. The heating device such as the heater only has to be arranged, for example, on an upper mold of the press forming die.

Moreover, in the embodiment, the plate thicknesses of the outer plate glass 12a and the inner plate glass 12b for the laminated glass 14 may be the same or may be different from each other. When the plate thicknesses of the outer plate glass 12a and the inner plate glass 12b are different from each other, a difference between the plate thickness of the outer plate glass 12a and the plate thickness of the second plate glass 12b may be relatively great, e.g. 0.5 mm or more. Moreover, the plate thickness of the inner plate glass 12b may be thinner than the plate thickness of the outer plate glass 12a. For example, the plate thickness of the inner plate glass 12b may be less than 1.6 mm. In this way, when the plate thicknesses of the outer plate glass 12a and the inner plate glass 12b for the laminated glass 14 are different from each other, each of both the glass plates 12a, 12b can be bent and formed individually into the desired shape according to the request.

Moreover, the embodiment depicts an example in the case of manufacturing the respective glass plates 12 for the laminated glass 14 in which two glass plates 12 are laminated. However, the present invention is not limited to this, but the embodiment can be applied to the case of manufacturing the respective glass plates 12 for the laminated glass 14 in which three or more glass plates are laminated.

The invention claimed is:

1. A manufacturing method for a laminated glass, the laminated glass comprising a plurality of glass plates, the method comprising:
laminating the plurality of glass plates, wherein laminating the plurality of glass plates comprises
a first main forming step of heating a first glass plate of the plurality of glass plates to a first softening point temperature or higher to perform a main forming for the first glass plate and press molding the first glass plate to a first bent shape that is shallower than a first desired shape of the first glass plate that is required for the first glass plate;
a second main forming step of heating a second glass plate of the plurality of glass plates to a second softening point temperature or higher to perform a main forming for the second glass plate and press molding the second glass plate to a second bent shape that is shallower than a second desired shape of the second glass plate that is required for the second glass plate;
a first finish forming step of bending and forming the first glass plate into the first desired shape after the first main forming step by controlling and maintaining a temperature of the first glass plate at a temperature at or above the first softening point temperature and deforming the first glass plate with a dead weight of the first glass plate for a first time period;
a second finish forming step of bending and forming the second glass plate into the second desired shape after the second main forming step by controlling and maintaining a temperature of the second glass plate at or above the second softening point temperature and deforming the second glass plate with a dead weight of the second glass plate for a second time period, wherein the first desired shape of the first glass plate and the second desired shape of the second glass plate are different from each other; and
a cooling step of cooling the first glass plate and the second glass plate after the first finish forming step and the second finish forming step by using a cooling device such that the temperature of the first glass plate is lowered below the first softening point temperature and the temperature of the second glass plate is lowered below the second softening point temperature,
wherein the first main forming step and the second main forming step are performed by using a same forming die that includes a lower forming die and an upper forming die,
wherein the first main forming step includes a press formation that includes holding the first glass plate with the lower forming die, and the second main forming step includes a press formation that includes holding the second glass plate with the upper forming die,
wherein a first condition for lowering the temperature of the first glass plate to below the first softening point and a second condition for lowering the temperature of the second glass plate to below the second softening point are different from each other, and
the first condition is the first time period after the first main forming step until the cooling step starts, the second condition is the second time period after the second main forming step until the cooling step starts, and the first time period is different from the second time period.

2. The manufacturing method for the laminated glass according to claim 1 further comprising:
a conveyance step of conveying the first glass plates and the second glass plates alternately by a prescribed number of sheets in order,
wherein the first finish forming step and the second finish forming step are performed by a same apparatus, and at least a portion of the first finish forming step and at least a portion of the second finish forming step are performed simultaneously, and
wherein the first finish forming step and the second finish forming step are performed by the prescribed number of sheets while changing the first condition and the second condition.

3. The manufacturing method for the laminated glass according to claim 2,
wherein the prescribed number of sheets is one sheet.

4. The manufacturing method for the laminated glass according to claim 1 further comprising:
a step of conveying the first glass plate and the second glass plate in no particular order;

wherein the first finish forming step and the second finish forming step are performed by a same apparatus, and at least a portion of the first finish forming step and at least a portion of the second finish forming step are performed simultaneously, and wherein the first finish forming step and the second finish forming step are performed depending on the conveyed first glass plate and the conveyed second glass plate while changing the first condition and the second condition.

5. The manufacturing method for the laminated glass according to claim 1,
wherein transferring the first glass plate and the second glass plate, for which the main forming of the first glass plate and the main forming of the second glass plate is completed, after the first main forming step and the second main forming step, to a conveyance die, in order to convey the first glass plate and the second glass plate to the first finish forming step and the second finish forming step, is performed inside a furnace.

6. The manufacturing method for the laminated glass according to claim 1,
wherein transferring the first glass plate and the second glass plate, for which the main forming is completed, after the first main forming step and the second main forming step, to a conveyance die, in order to convey the first glass plate and the second glass plate to the first finish forming step and the second finish forming step, is performed outside a furnace.

7. The manufacturing method for the laminated glass according to claim 1,
wherein the first main forming step and the second main forming step are performed while the first glass plate and the second glass plate are heated.

8. The manufacturing method for the laminated glass according to claim 1,
wherein the first glass plate and the second glass plate are different from each other in at least one of a composition and a plate thickness.

9. The manufacturing method for the laminated glass according to claim 1,
wherein on at least one surface of at least one glass plate of the first glass plate and the second glass plate, a functional coating film is deposited.

10. The manufacturing method for the laminated glass according to claim 9,
wherein the functional coating film is deposited on a concave surface of the at least one glass plate of the first glass plate and the second glass plate and is provided with a heat ray reflection function.

11. The manufacturing method for the laminated glass according to claim 1,
wherein a difference between a thickness of the first glass plate and a thickness of the second glass plate is 0.5 mm or more.

12. The manufacturing method for the laminated glass according to claim 1,
wherein the first and second glass plates are formed of a float glass.

13. The manufacturing method for the laminated glass according to claim 1,
wherein the first and second glass plates are formed of a soda-lime glass.

14. The manufacturing method for the laminated glass according to claim 1,
wherein the first and second glass plates are placed on a cooling die that is a female die formed in a shape of a ring along an outline of one of the first glass plate or the second glass plate,
wherein the first finish forming step is performed until the temperature of the first glass plate descends to less than the first softening point temperature, and
wherein the second finish forming step is performed until the temperature of the second glass plate descends to less than the second softening point temperature.

15. The manufacturing method for the laminated glass according to claim 1, wherein the cooling device starts cooling the first glass plate after the first time period, and the cooling device starts cooling the second glass plate after the second time period.

16. A manufacturing method for a laminated glass, the laminated glass comprising a first glass plate and a second glass plate, the method comprising:
laminating the first glass plate and the second glass plate, wherein laminating the first glass plate and the second glass plate comprises
a first main forming step comprising heating the first glass plate to a first softening point temperature for the first glass plate or higher, and press molding the first glass plate to a first bent shape that is shallower than a first desired shape of the first glass plate that is required for the first glass plate;
a second main forming step comprising heating the second glass plate to a second softening point temperature for the second glass plate or higher, and press molding the second glass plate to a second bent shape that is shallower than a second desired shape of the second glass plate that is required for the second glass plate;
a first finish forming step implemented after the first main forming step and comprising controlling and maintaining a temperature of the first glass plate at a temperature at or above the first softening point temperature and forming the first glass plate into the first desired shape using deformation by dead weight of the first glass plate, the first finish forming step being implemented for a first period of time;
a second finish forming step implemented after the second main forming step and comprising controlling and maintaining a temperature of the second glass plate at or above the second softening point temperature and forming the second glass plate into the second desired shape using deformation by dead weight of the second glass plate, the second finish forming step being implemented for a second period of time different from the first period of time, and
a cooling step of cooling the first glass plate and the second glass plate after the first finish forming step and the second finish forming step such that the temperature of the first glass plate is lowered below the first softening point temperature and the temperature of the second glass plate is lowered below the second softening point temperature.

* * * * *